United States Patent

Haraguchi

[11] Patent Number: 6,160,966
[45] Date of Patent: *Dec. 12, 2000

[54] APPARATUS FOR USE IN LOADING AND UNLOADING CARTRIDGE, INCLUDING RESTRICTION PORTION FOR RESTRICTING A LOADING OPERATION OF A CARTRIDGE OR RESTRICTING ENGAGEMENT WITH CARTRIDGE DURING A LOADING OPERATION

[75] Inventor: Shosuke Haraguchi, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/901,136

[22] Filed: Jul. 28, 1997

[30] Foreign Application Priority Data

Jul. 31, 1996 [JP] Japan .................... 8-216966

[51] Int. Cl.[7] .................................................. G03B 17/02
[52] U.S. Cl. ........................................................ 396/538
[58] Field of Search .................................. 396/513, 516, 396/535, 538

[56] References Cited

U.S. PATENT DOCUMENTS

| | | |
|---|---|---|
| 4,783,671 | 11/1988 | Haraguchi . |
| 4,910,543 | 3/1990 | Kawamura et al. . |
| 4,963,905 | 10/1990 | Haraguchi et al. . |
| 5,070,349 | 12/1991 | Haraguchi et al. . |
| 5,130,740 | 7/1992 | Suda et al. . |
| 5,182,590 | 1/1993 | Kaihara et al. . |
| 5,311,229 | 5/1994 | Haraguchi . |
| 5,329,326 | 7/1994 | Haraguchi . |
| 5,329,328 | 7/1994 | Haraguchi et al. . |
| 5,337,108 | 8/1994 | Kaihara et al. . |
| 5,347,334 | 9/1994 | Smart et al. . |
| 5,408,290 | 4/1995 | Haraguchi . |
| 5,715,495 | 2/1998 | Nishimura ............................. 396/538 |
| 5,812,896 | 9/1998 | Okuno et al. ........................ 396/538 X |

FOREIGN PATENT DOCUMENTS 7-199338   8/1995   Japan .

*Primary Examiner*—David M. Gray
*Attorney, Agent, or Firm*—Fitzpatrick, Cella, Harper & Scinto

[57] ABSTRACT

An apparatus adapted for use with a cartridge, e.g., in loading a cartridge in a camera, includes an engagement portion settable in either a first state or second state and engageable with a film cartridge loaded in a cartridge chamber, and a restriction device that either (1) restricts a loading operation of a cartridge into the cartridge chamber when the engagement portion is in the second state, or (2) restricts engagement of the cartridge with the engagement portion where the engagement portion is in the second state.

17 Claims, 13 Drawing Sheets

APPARATUS FOR USE IN LOADING AND UNLOADING CARTRIDGE, INCLUDING RESTRICTION PORTION FOR RESTRICTING A LOADING OPERATION OF A CARTRIDGE OR RESTRICTING ENGAGEMENT WITH CARTRIDGE DURING A LOADING OPERATION

BACKGROUND OF THE INVENTION

1. Field of the Invention

The present invention relates to an improved ejection device applicable to a cartridge, and in particular, to an improved apparatus, such as a camera, into which the cartridge is loaded.

2. Description of the Related Art

Recently, a film cartridge having a light lock door (light tight cartridge door) has been proposed, for example, in U.S. Pat. No. 5,347,334. In a film cartridge of this type, since it is necessary to control the opening and closing of the light lock door on the camera side, it also is necessary to provide the camera with a new light lock door operating mechanism which has not been provided in cameras using ordinary film cartridges available in the market. At the same time, it is necessary to provide an ejection mechanism for the film cartridge in order to improve operability.

Since a film cartridge of this type is operated by driving a spool (film take-up shaft) that is directly supported by the camera, no external force should be applied to the cartridge shell. Thus, it is not sufficient merely to provide an ejection mechanism that simply biases the film cartridge in the discharge direction, e.g., by means of a spring. In view of this, the present applicant has proposed in Japanese Patent Laid-Open No.7-199338 an ejection mechanism satisfying the above conditions.

In the above-proposed camera, however, a member protruding near the film cartridge chamber is directly pushed in with the cartridge chamber cover in order to set the eject member in a non-contact state with respect to the film cartridge, resulting in the following problems:

(1) The entire load (biasing force) for causing the eject member to retract is applied to the cartridge chamber cover, resulting in either a lift or play of the cartridge chamber cover ("play" here means a variation between the state in which the cartridge chamber cover is slightly lifted and the state in which it is completely closed).

(2) Due to the above construction, in which the protrusion is pushed when closing the cartridge chamber cover to load the film cartridge, the protrusion is exposed near the film cartridge chamber (or the cartridge chamber cover) when the cartridge chamber cover is open, resulting in drawbacks in the outward appearance, safety, etc. of the device.

SUMMARY OF THE INVENTION

In one aspect, the present invention relates to an apparatus adapted to use a cartridge, such as a camera, comprising a cartridge discharge device arranged to bias a film cartridge in a discharge direction from a cartridge chamber of the apparatus by a resilient force, and a prevention device which prevents the bias force from acting on a cover of the cartridge chamber when the cover of the cartridge chamber is in the closed state, wherein the bias force of the cartridge discharge device exerts no undesirable effect on the cover of the cartridge chamber.

In a preferred embodiment, the cartridge discharge device comprises a linkage device capable of receiving an action of the prevention device when the cartridge chamber is loaded with a film cartridge. The prevention device also may comprise a movement device that moves the prevention device between an acting position and a non-acting position, wherein the cartridge discharge device is moved to a position where it is out of contact with a cartridge loaded in the cartridge chamber when the prevention device is moved to the acting position. The apparatus further may comprise a holding device that keeps the cover of the cartridge chamber in a closed state, wherein the prevention device moves with an operation of the holding device, and/or a driving device that opens and closes a cover of the film cartridge loaded in the cartridge chamber, wherein the driving device is interlocked with a movement of the prevention device. The prevention device further may comprise a restriction device that restricts loading of a film cartridge into the cartridge chamber when the prevention device moves to the acting position. The apparatus still further may comprise a driving device that opens and closes a cover of the film cartridge loaded in the cartridge chamber, wherein the driving device is interlocked with a movement of the prevention device.

In another aspect, the present invention relates to an apparatus adapted to a cartridge, comprising a holding device that keeps a cover of a cartridge chamber in a closed state, and a cartridge discharge device that moves a cartridge in a discharge direction from a cartridge chamber, wherein the cartridge discharge device moves to a position where it is out of contact with the cartridge loaded in the cartridge chamber when the holding device is operated.

In a preferred embodiment, the cartridge discharge device moves to a position where it is out of contact with a shell of the cartridge loaded in the cartridge chamber when the holding device is operated. In another embodiment, the cartridge discharge device moves to a position where it is out of contact with a cartridge loaded in the cartridge chamber when the holding device is operated, wherein the holding device keeps the cover of the cartridge chamber in the closed state.

In yet another aspect, the present invention relates to an apparatus adapted to a cartridge, comprising a cartridge discharge device that moves a cartridge in a discharge direction from a cartridge chamber, and a movement device which acts on the cartridge discharge device when it is moved to a predetermined position by a cartridge loaded in the cartridge chamber, and moves the cartridge discharge device to a position where it is out of contact with the cartridge loaded in the cartridge chamber.

In yet another aspect, the present invention relates to an apparatus adapted to use a cartridge, comprising a cartridge discharge device which moves to a first position when the cartridge is discharged from a cartridge chamber and a second position when the cartridge is loaded into the cartridge chamber, and a movement device which acts on the cartridge discharge device when it is moved to the second position, and moves the cartridge discharge device to a position where it is out of contact with the cartridge loaded in the cartridge chamber.

In still another aspect, the present invention relates to an apparatus adapted to a cartridge, comprising an engagement portion engagable with a cartridge loaded in a cartridge chamber, and a restriction device that restricts loading of the cartridge into the cartridge chamber when the engagement portion does not engage the cartridge in a predetermined engagement phase.

In a preferred embodiment, the engagement portion further comprises a driving portion that opens and closes a cover of the cartridge, and the predetermined engagement phase comprises a phase in which the driving portion closes the cover of the cartridge. The restriction device may comprise a cartridge discharge device that discharges the cartridge from the cartridge chamber.

In yet another aspect, the present invention relates to an apparatus adapted to use a cartridge, comprising an engagement portion engagable with a cartridge loaded in a cartridge chamber, and a restriction device that restricts engagement of the cartridge with the engagement portion when the engagement portion does not engage with the cartridge in a predetermined engagement phase. In a preferred embodiment, the engagement portion comprises a driving portion that opens and closes a cover of the cartridge, and the predetermined engagement phase comprises a phase in which the driving portion closes the cover of the cartridge.

In each of the preferred embodiments, the cartridge may comprise an image recording medium cartridge, i.e., a film cartridge, and the apparatus preferably comprises a camera.

Other aspects and other objects and advantages of the present invention will become apparent from the following detailed description of the preferred embodiments.

DETAILED DESCRIPTION OF THE PREFERRED EMBODIMENTS

A specific embodiment of the present invention will now be described in detail with reference to the drawings.

Figure 1:
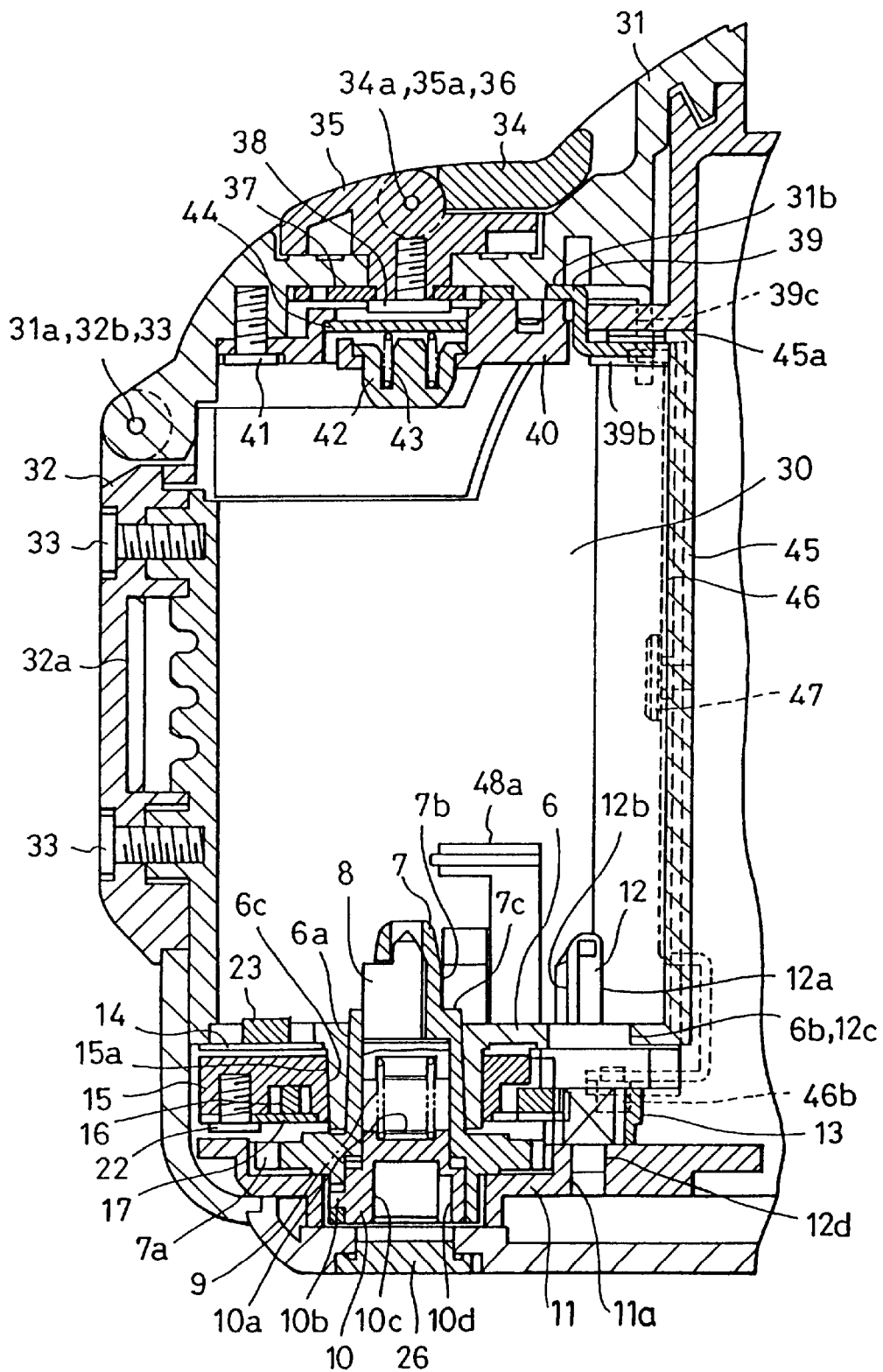
FIG. 1 is a sectional view showing the construction of a portion near a cartridge chamber of a camera according to an embodiment of the present invention.
Figure 2:
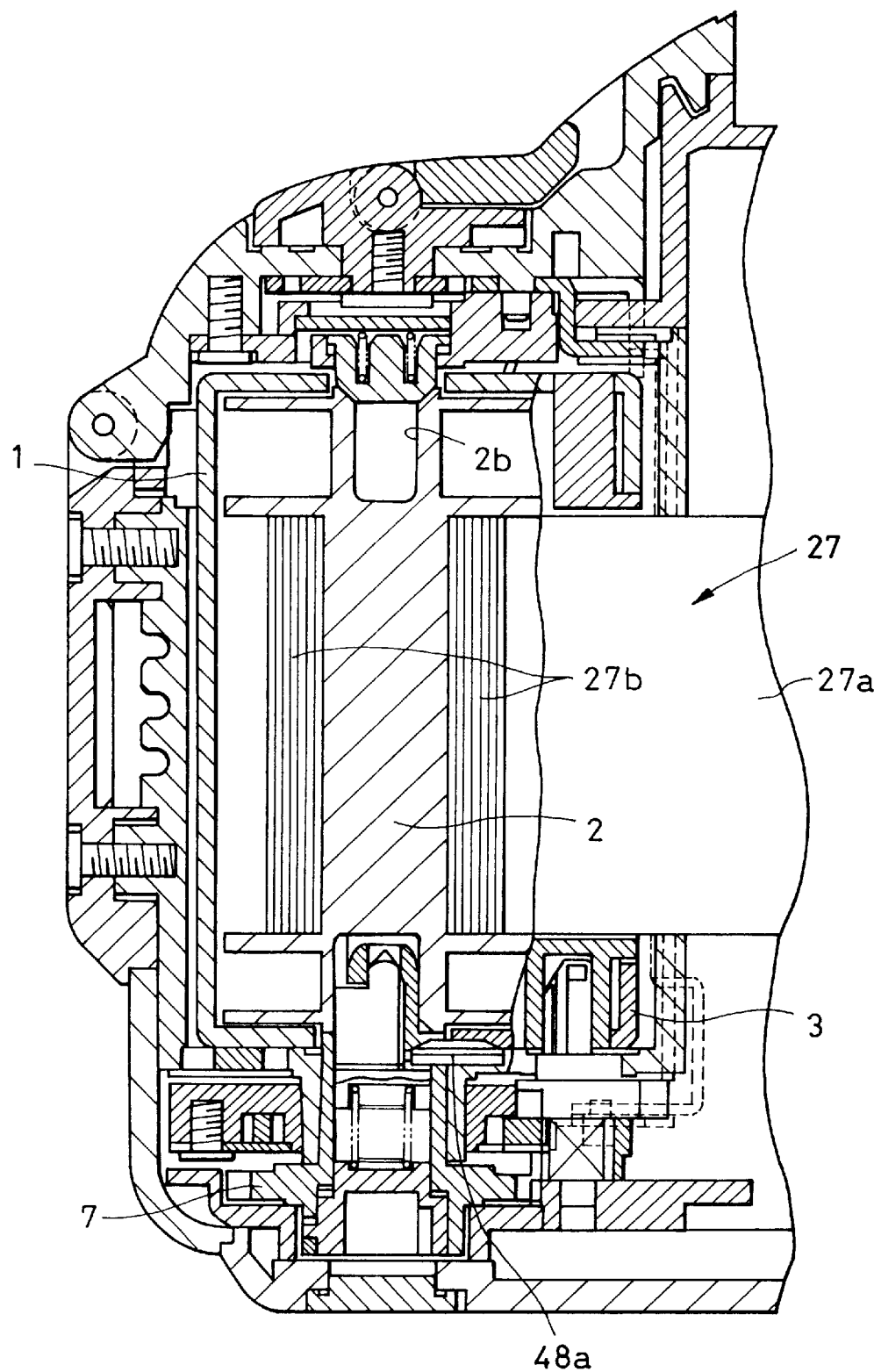
FIG. 2 is a sectional view showing the state in which the cartridge chamber shown in FIG. 1 is loaded with a film cartridge.
Figure 3:
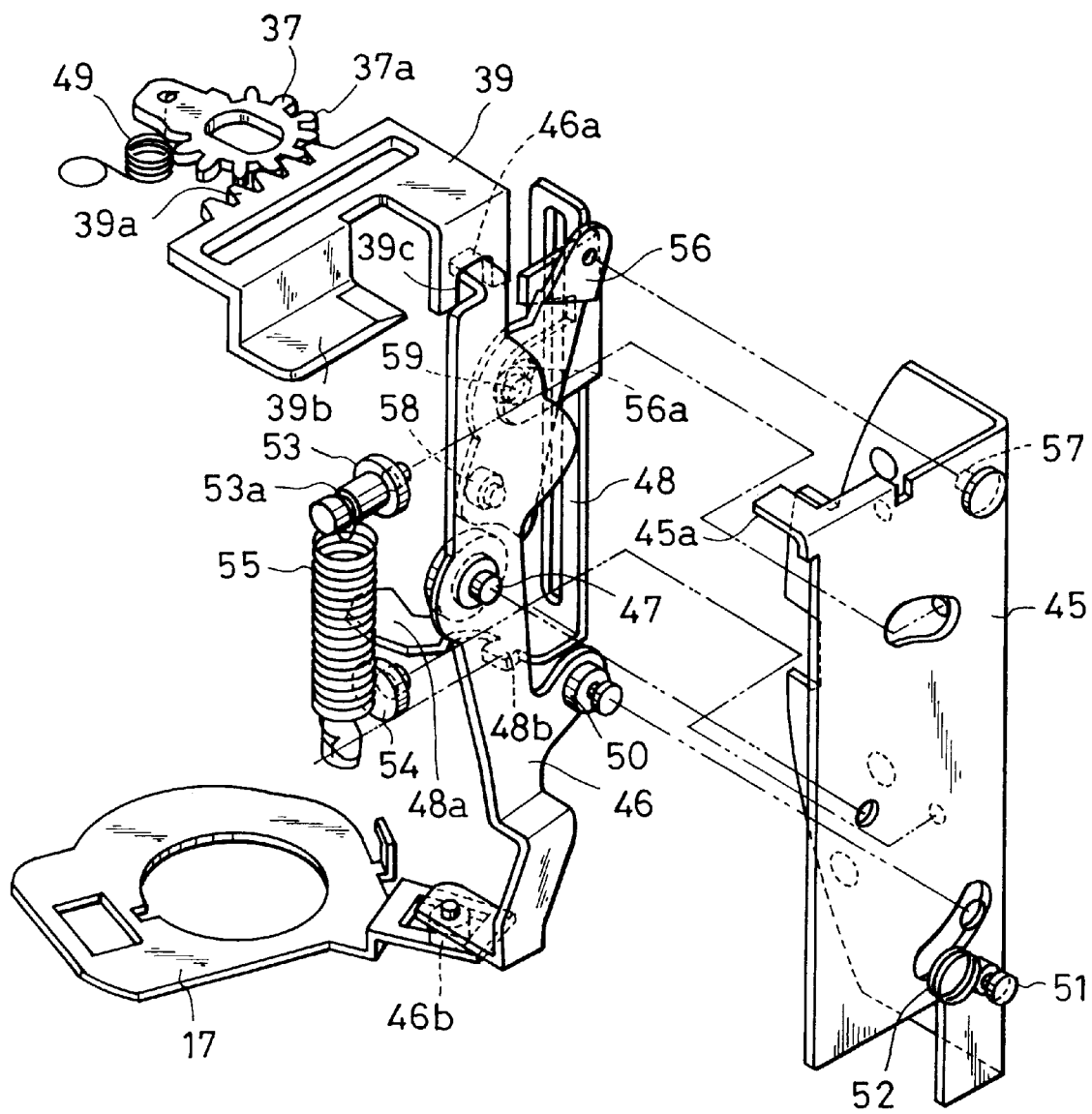
FIG. 3 is a perspective view showing the mechanical construction of an essential part of a camera according to an embodiment of the present invention.
Figure 12:
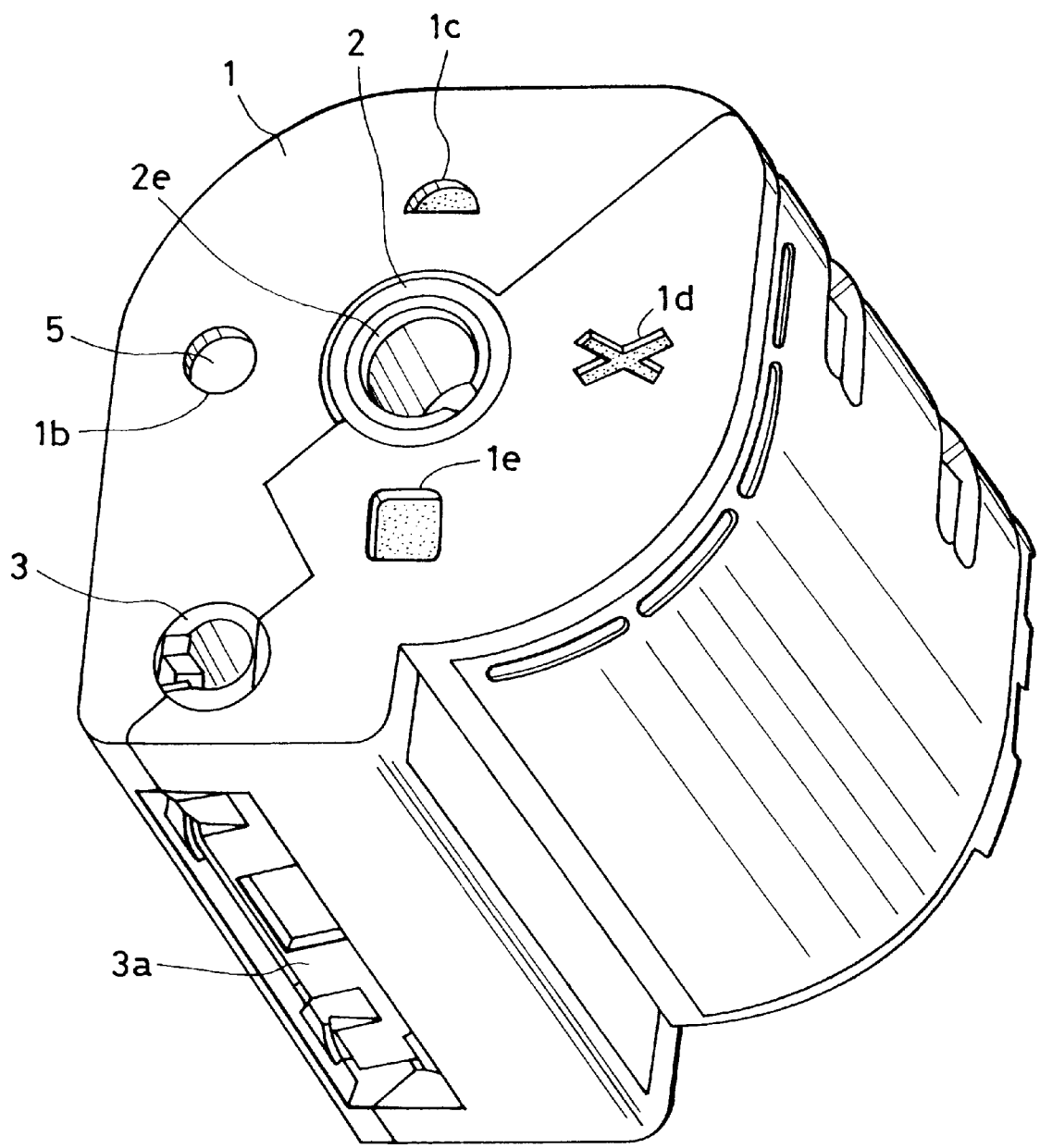
FIG. 12 is a perspective view of a film cartridge used in an embodiment of the present invention.
Figure 13:
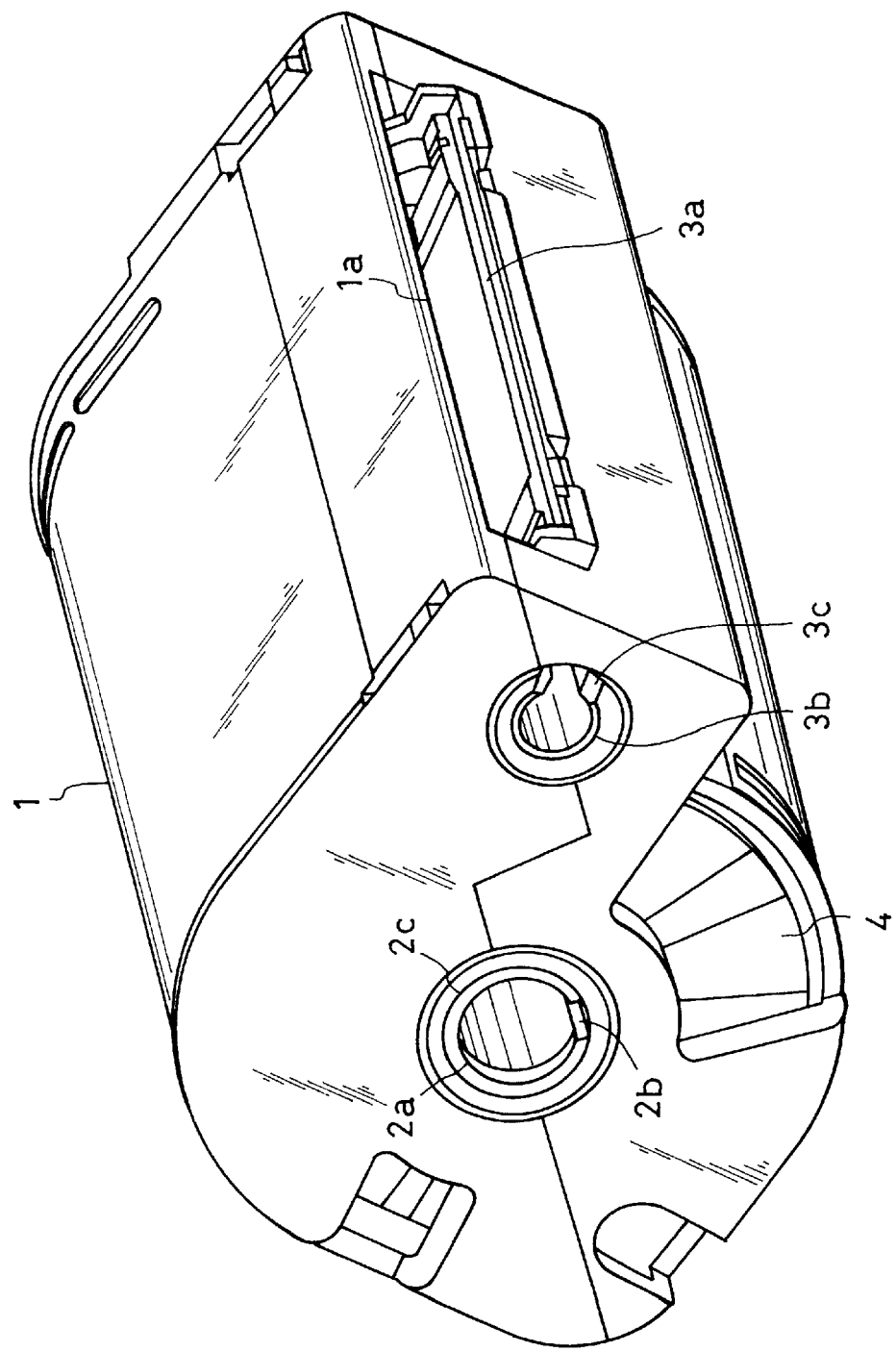
FIG. 13 is a perspective view showing the film cartridge of FIG. 12 from the side opposite to that of FIG. 12.

FIGS. 1 through 13 are diagrams showing an embodiment of the present invention. More specifically, FIG. 1 is a sectional view showing the construction of a portion near a cartridge chamber of a camera according to an embodiment of the present invention; FIG. 2 is a sectional view showing the state in which the cartridge chamber shown in FIG. 1 is loaded with a film cartridge; FIG. 3 is a perspective view showing the mechanical construction of an essential part of a camera according to an embodiment of the present invention; FIGS. 4 through 11 are diagrams showing how the mechanism of FIG. 3 operates; and FIGS. 12 and 13 are perspective views showing, from different directions, the film cartridge shown in FIG. 2.

First, referring to FIGS. 12 and 13, a film cartridge to be used in a camera according to an embodiment of the present invention will be described.

In these drawings, numeral 1 indicates a film cartridge shell; numeral 2 indicates a spool; and numeral 3 indicates a light lock door.

The light lock door 3 includes a door portion 3a, which is rotatably supported on the film cartridge shell 1. Numeral 3b indicates a shaft portion, which is provided so as to be concentric with a rotation axle of the light lock door (not shown), and has an engagement portion 3c for transmitting torque. When, in FIG. 13, the light lock door 3 is rotated clockwise by utilizing the shaft portion 3b and the engagement portion 3c, the door portion 3a, which has been in the closed state shown in FIG. 12, is opened as shown in FIG. 13, making it possible for a film (not shown) to be thrust or extracted out of the cartridge. Conversely, when, in FIG. 13, the light lock door 3 is rotated counterclockwise, the closed state as shown in FIG. 12 is attained, in which the door portion 3a is closed to make the film cartridge light tight.

At one end of the spool 2, there are provided a shaft portion 2a, a key groove portion 2b and an abutting portion 2c, and, at the other end of the spool 2, there is provided a shaft portion 2e. When this spool 2 is rotated counterclockwise in FIG. 13, the film (not shown) is taken up, and, when it is rotated clockwise, the film (not shown) is thrust out from the opening 1a, with the door portion 3a of the light lock door 3 being open. Further, the spool 2 is integrally provided with a data disc 4 and an indicator 5. By controlling the stop phase of the cartridge spool 2, i.e., the special phase or indexing of the spool, and thereby the data disc 4 and the indicator 5, the condition of use of the film is indicated.

The data disc 4 has data, such as the film ISO sensitivity and the number of usable frames, indicated by barcode. The condition of use of the film is indicated by the stop phase of the indicator 5.

Next, the condition of use of the film indicated by the indicator 5 will be described. In FIG. 12, numeral 1b indicates an indicator window showing that all the frames of the film are unused; numeral 1c is an indicator window showing that some frames have been used; numeral 1d indicates an indicator window showing that all the frames have been used; and numeral 1e indicates an indicator window indicating "development-completed" state. The condition of use of the film is indicated by the stop phase of the indicator 5.

As shown in FIG. 13, the spool 2 can be rotated only when the door portion 3a of the light lock door 3 is open. In the closed state, as shown in FIG. 12, a lock mechanism (not shown) operates to make it impossible for the spool to rotate.

When the film cartridge is loaded into the camera, only the spool 2 is supported, the film cartridge shell 1 being kept untouched. Specifically, centering of the cartridge shell 1 is effected by the shaft portions 2a and 2e, and the abutting portion 2c abuts against a reference surface on the camera side. Further, the shaft portion 3b of the light lock door 3 acts as a detent for locating the film cartridge shell 1 relative to the camera, thereby preventing rotational movement of the cartridge shell 1.

Next, the construction of a camera according to an embodiment of the present invention will be described.

First, with reference to FIGS. 1 through 3, the construction of the components near the film cartridge chamber will be described.

In this embodiment, a film cartridge is loaded into the camera from above, and, even when the camera is attached to a tripod by means of a tripod mounting screw portion (not shown) provided on the lower side of the camera, the loading and extraction of the film cartridge can be easily conducted. The viewer side with respect to the plane of FIG. 1 is the operator side, and the opposite side is the photographing lens side. In the upper portion of the photographing optical axis, in order to arrange a finder mechanism and a built-in strobe (which are not shown), the cartridge chamber cover 31 is opened to the left to thereby avoid interference with the operation of such devices.

In FIGS. 1 and 2, numeral 30 indicates a cartridge chamber to be loaded with a film cartridge; and numeral 31 indicates a cartridge chamber cover for opening and closing the cartridge chamber 30. As the cartridge chamber cover 31 is closed, the film cartridge is loaded by being pushed into the cartridge chamber 30. Numeral 32 indicates a suspension ring having a passing portion 32a for a neck strap (not shown) attached to the camera body 6 by means of screws 33. The suspension ring 32 is provided with a rotation axle for the cartridge chamber cover 31, and a spring pin 33c is inserted into fitting holes 31a and 32b, whereby an opening/closing mechanism for the cartridge chamber cover 31 having a predetermined friction is formed.

Numeral 34 indicates a lock knob, which is mounted on a lock rotating member 35 by inserting a spring pin 36 into fitting holes 34a and 35a. This lock knob 34 is raised manually from the locked state shown in FIG. 1 to thereby execute a rotating operation. The lock rotating member 35 is rotatably supported on the cartridge chamber cover 31, and mounted by a screw 38 to a lock rotating member 37, also shown in FIG. 3, so as to integrally rotate therewith. Numeral 39 indicates a lock member, which is guided by a guide portion 31b of the cartridge chamber cover 31 so as to be capable of making linear movements in a direction perpendicular to the plane of FIG. 1, and, as shown in FIG. 3, engaged with a pinion portion 37a of the lock pinion 37 by a rack portion 39a, converting the rotating operation input from the lock knob 34 into a linear movement.

Numeral 40 indicates a presser member, which is attached to the cartridge chamber cover 31 by a screw 41. Numeral 42 indicates a cartridge pressing member, which is prevented from coming off by a stopper 44, and biased downwards as seen in FIGS. 1 and 2 by a spring 43 to act on the shaft portion 2b of the spool 2 of the film cartridge (See FIG. 2), executing the operations of centering and downward depression in FIG. 2. Numeral 45 indicates a transmission base plate (See FIGS. 1 and 3), with a transmission lever 46 being rotatably supported on a shaft 47. The transmission base plate 45 is firmly attached to the camera body 6 by means of a screw (not shown).

When the lock knob 34 is raised and rotated counterclockwise (FIG. 1), the cartridge chamber cover 31 is locked in the closed state. When the lock knob 34 is rotated clockwise, the lock is disabled. In the locking operation, the lock member 39 moves to the back side of the plane of FIG. 1, and the lock portion 39b is engaged with an engagement portion 45a (See FIG. 3 also), preventing the cartridge chamber cover 31 from being opened. Further, a transmission portion 39c acts on a transmission portion 46a (See FIG. 3 also) to swing the transmission lever 46. When performing the lock disabling operation, the lock member 39 moves to the back side of the plane of FIG. 1, and, after causing the transmission lever 46 to swing, the engagement of the lock portion 39b with the engagement portion 45a is cancelled, making it possible for the cartridge chamber cover 31 to be opened. The transmission lever 46 operates to drive the light lock door 3 of the film cartridge. A further description of the transmission system will be described below.

Next, with reference to FIGS. 1 and 2, the film cartridge drive portion will be described.

The camera body 6 has fitting holes 6a and 6b rotatably supporting a spool drive member 7 and an opening/closing drive member 12. A key member 8 and a spring 9 are incorporated in the above-mentioned spool drive member 7, and confined by a spring receiving portion 10a of an intermediate member 10. The intermediate member 10 is fitted into a fitting hole concentric with the rotating shaft of the spool drive member 7, and is opposed to the spool drive member 7 by the action of a protrusion 10b, and mounted by being rotated in the film rewinding direction by a bayonet system, forming a reliable torque transmission and stopper in the film rewinding direction. However, the construction of this portion is not limited to this joining method; other methods, such as gluing, fixation by screw, etc. are possible. Further, the intermediate member 10 has a drive section formed by a hole portion 10c and a key groove 10d. When the film cannot be rewound due to some trouble or other reason, a cover 26 is removed and a tool is inserted from outside the camera into the hole portion 10c and the key groove 10d of the intermediate member 10 to thereby make it possible to rewind the film.

In the camera of this embodiment, mechanical drive and film feeding are effected by a built-in motor (not shown). The spool drive member 7 is also driven by the built-in motor.

Numeral 7a indicates a gear portion, which transmits the torque of the built-in motor through a row of intermediary gears (not shown). The spool drive member 7 is engaged with the spool 2 of the film cartridge, and, apart from positioning, performs the transmission of torque. Specifically, the shaft portion 7b is engaged with the shaft portion 2a, and the abutting portion 2c abuts the reference surface 7c, thereby effecting the centering and the axial positioning of the film cartridge. Further, when the key groove 2b is engaged with the key member 8, transmission of torque from the spool drive member 7 to the spool 2 becomes possible. The spring 9 serves to absorb stroke when, at the time of the loading of the film cartridge, there is a difference in phase between the above-mentioned key member 8 and the key groove portion 2b. Even when there is a deviation in key phase, agreement in key phase is attained by rotating the spool drive member 7, and engagement is effected due to the force of the spring 9, making it possible for torque transmission to be reliably effected.

A cam member 13 is attached to the opening/closing drive member 12 so as to rotate integrally therewith. This opening/closing drive member 12 engages with the light lock door 3 of the film cartridge, and serves as a detent for locating the film cartridge and performs the opening and closing of the light lock door 3. Specifically, by engaging the shaft portion 3b of the film cartridge with the shaft portion 12a, it serves as a detent/locator, and, by engaging the engagement portion 3c with the key portion 12b, it rotates the light lock door 3 to open or close it.

Numeral 11 indicates a presser member, which is mounted on the camera body by fastening means (not shown). Both the spool drive member 7 and the opening/closing drive member 12 are placed between the camera body 6 and the presser member 11, whereby positional restriction in the thrust direction is effected. The spool drive member 7 is prevented from falling by a long engagement with fitting hole 6a of the camera body 6. The opening/closing drive member 12 is prevented from falling by engagement between fitting hole 6b and engagement portion 12c and engagement between fitting hole 11a of the presser member 11 and engagement portion 12d.

In the camera body 6, the outer periphery of the fitting hole 6a is formed as a sliding shaft 6c, and engaged with a slide hole 15a of a rotating member 15 to thereby serve as a rotating shaft. Numeral 16 indicates a slide member and numeral 17 indicates a transmission member, which integrally rotate with the rotating member 15. Numeral 14 indicates a flexible printed circuit board, which has a rotation phase detecting signal pattern for the rotating member 15. Further, a photoreflector 23 for reading signals from a data disc 4 is arranged on the flexible printed circuit board 14.

Next, the action of the above-mentioned transmission lever 46, which operates by operating the lock knob 34, will be described. The transmission portion 46b of the transmission lever 46 shown in FIG. 3 acts upon the transmission member 17.

In the following, the mechanism by means of which the opening/closing drive member 12 is driven by the transmission member 17 will be described with reference to FIGS. 9 through 11. First, the construction of the mechanism will be described.

As stated above, the opening/closing drive member 12 is capable of swinging around the shaft portions 12a and 12d, and positional control is effected by the stopper 12e abutting against the stoppers 6d and 6e of the camera body 6. As shown in FIG. 9, the state in which restriction is effected by the stopper 6d corresponds to the closed state of the light lock door 3 of the film cartridge, and, as shown in FIG. 11, the state in which restriction is effected by the stopper 6e corresponds to the open state of the light lock door 3. The opening/closing drive member 12 is engaged with the cam member 13 through a cam member portion 13b; drive member portion 12f has two corresponding sides cut and makes an integral movement therewith. Numeral 13a indicates a cam portion. Numeral 12g indicates a gear portion, which is engaged with a gear portion 15b of the rotating member 15. As stated above, the rotating member 15 rotates using the slide hole 15a as a rotation axis.

Numeral 20 indicates a phase detection armature, which is mounted to the rotating member 15 and rotates integrally therewith, sliding on the above-mentioned flexible printed circuit board 14 to perform phase detection for the rotating member 15. Specifically, it is preset so as to detect the condition of FIGS. 11 and 13, which corresponds to the open state of the light lock door 3, permitting the letting out (thrusting) of the film and photographing in this condition only.

The slide member 16 is supported on the rotating member 15 so as to be linearly slidable. The guide protrusion 16a is guided by the guide groove 15c. Further, the guide portions 15d and 16b interact, permitting the slide member 16 to perform linear sliding movement only.

Numeral 21 indicates a compression coil spring, one end of which acts on the receiving surface 15e of the rotating member 15 and the other end of which acts on the arm portion 16c of the slide member 16 to resiliently bias it. Numeral 16d indicates a cam portion, which acts on a cam portion 13a of the cam member 13. The transmission member 17 serves as a stopper for the slide member 16. The transmission member 17 is engaged with the rotating member 15 through engagement portions 15g and 17a, engaging the engagement portions 15f and 17b, and fixed to the rotating member 15 by means of a screw 22. The screw 22 also serves as a detent for the rotation of the transmission member 17 relative to the rotating member 15. However, it is possible to provide some other positioning means. Numeral 17c indicates a transmission portion, which serves as an interface portion for transmitting movement from a transmission portion 46b of a transmission lever 46 (See FIG. 3).

Next, the operation of the mechanism will be described.

Figure 9:
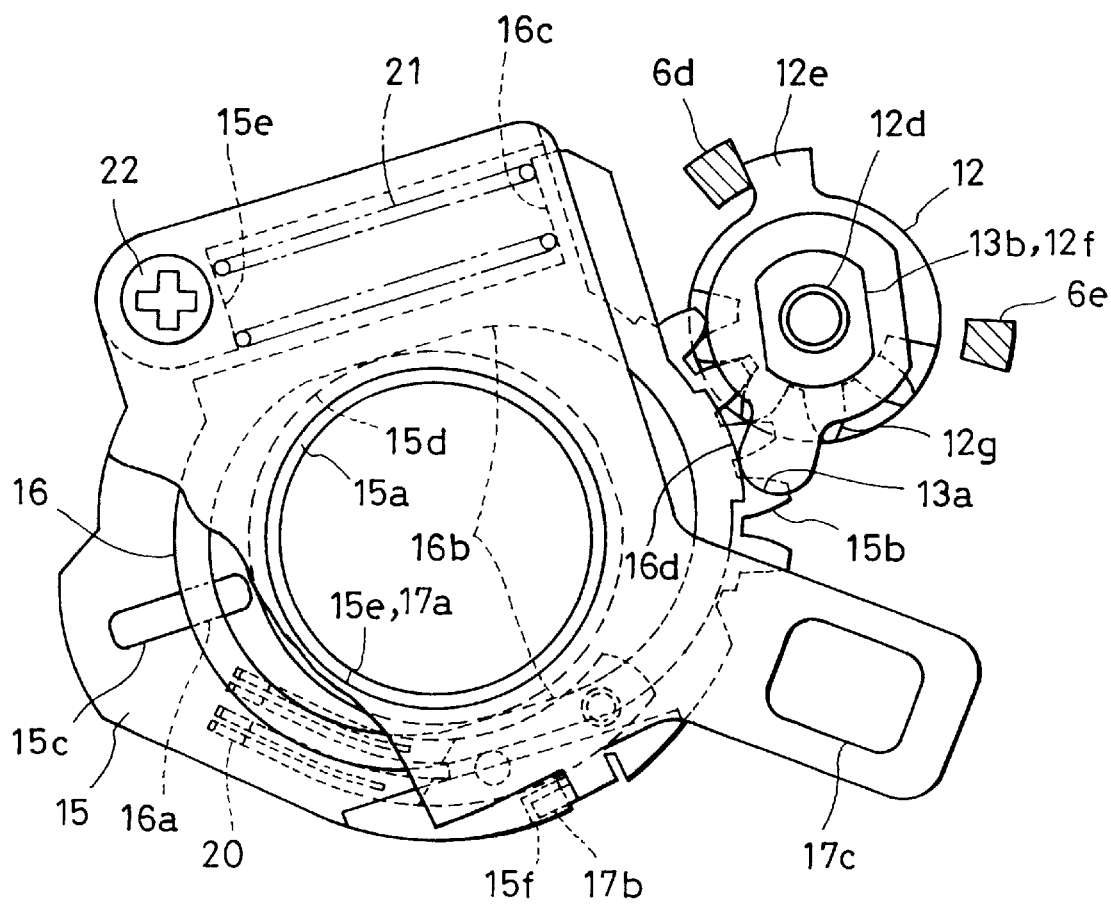
FIG. 9 is a diagram showing positional relationships between various components when a light lock door is closed in a camera according to an embodiment of the present invention.

In the condition shown in FIG. 9, the cam portion 16d of the slide member 16 abuts the cam portion 13a of the cam member 13, and the resilient force due to the spring 21 is applied, whereby the opening/closing drive member 12 is resiliently biased counterclockwise, and the stopper 12e abuts the stopper 6d, thereby restricting rotation. This condition corresponds to the position guaranteeing the closed state of the light lock door 3 of the film cartridge. In this condition, the lock of the lock member 39 is disabled and the cartridge chamber cover 31 may be opened, whereby it is possible to perform loading and unloading of the film cartridge.

When the film cartridge is loaded into the cartridge chamber 30, and the cartridge chamber cover 31 is closed, the lock knob 34 is rotated counterclockwise, the cartridge chamber cover 31 is locked in the closed state by the lock member 39 as described above, and the transmission portion 17c of the transmission member 17 is driven counterclockwise through the intermediation of the transmission lever 46, whereby the rotating member 15 and the slide member 16 also rotate integrally counterclockwise. At the same time, due to the engagement of the gear portions 15b and 12g, the opening/closing drive member 12 rotates clockwise to open the light lock door 3 of the film cartridge. At this time, due to the action of the cam portions 13a and 16d, the slide member 16 slides by means of the above-described sliding mechanism against the resilient force of the spring 21. FIG. 10 shows the state in which the cam portions 16d and 13a have reached the top dead point in the course of the camming process. In this condition, no rotational moment due to the cam portions 16d and 13a is generated.

Figure 11:
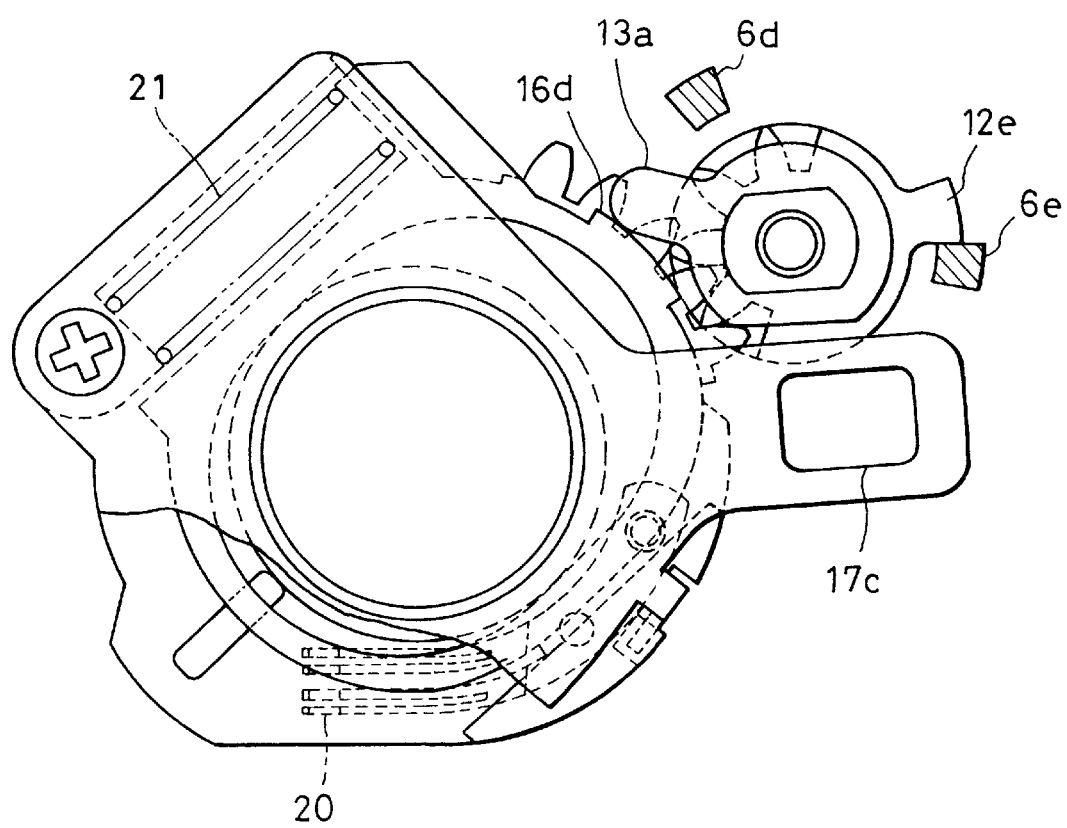
FIG. 11 is a diagram showing positional relationships between various components when the light lock door shown in FIG. 10 is open.

Further, when the transmission portion 17c is rotated counterclockwise, the opening/closing drive member 12 starts to rotate clockwise by the resilient force of the spring 21 due to the action of the cam portions 16d and 13a and stops in the condition of FIG. 11. In FIG. 11, clockwise positional restriction is effected on the opening/closing drive member 12 due to the abutment of the stoppers 12e and 6e, and this state corresponds to the position guaranteeing the open state of the light lock door 3 of the film cartridge. At this time, due to the action of the phase detection armature 20 and the flexible printed circuit board 14, a photographing operation permitting signal is generated, making it possible for the film to be let out (thrust) and for photographing operation to be performed.

Figure 10:
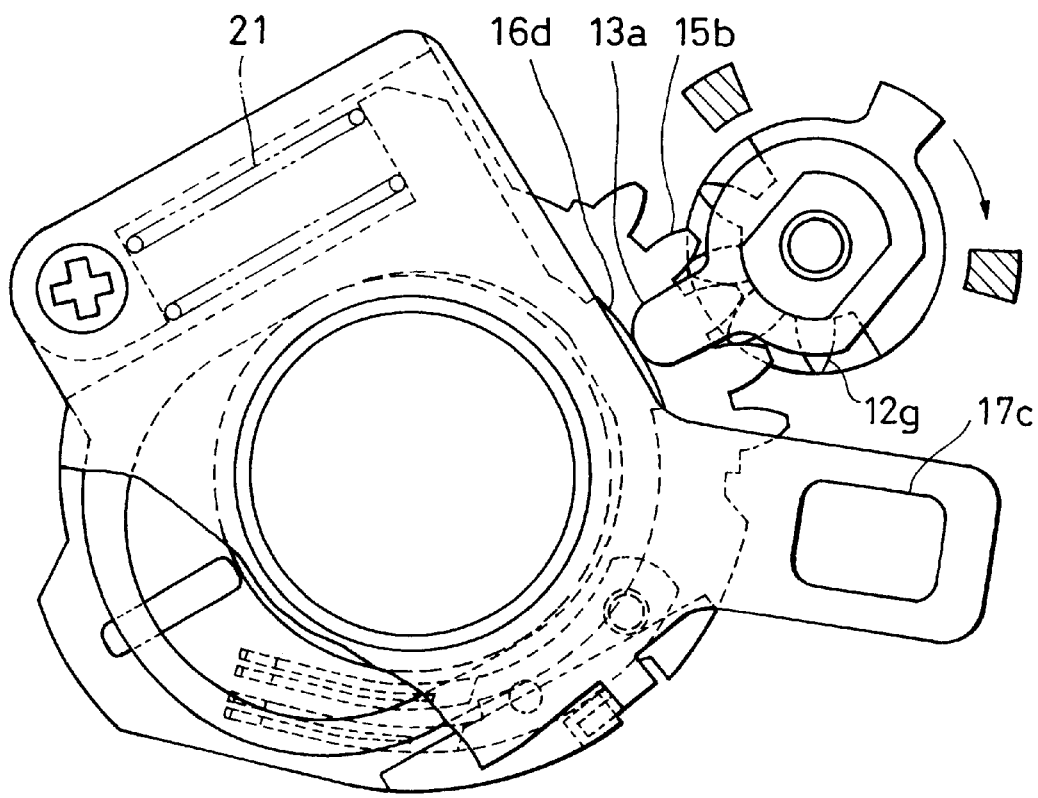
FIG. 10 is a diagram showing positional relationships between various components when the light lock door shown in FIG. 9 starts to be opened.

When, after the completion of the photographing, the lock knob 34 is rotated clockwise to perform the operation of opening the cartridge chamber cover 31, transition is effected from the state of FIG. 11 to the state of FIG. 10 and to the state of FIG. 9 by an operation reverse to that described above.

Next, the method of driving the eject member will be described.

In FIGS. 1 through 3, numeral 48 indicates the eject member. An eject portion 48a protrudes into the film cartridge chamber, and, when the cartridge chamber cover 31 is opened, the lower surface of the cartridge shell 1 is pushed up for extraction of the film cartridge with which the cartridge chamber 30 is loaded, and the film cartridge 1 is pushed out upwards from the cartridge chamber 30.

In contrast to FIG. 1, FIG. 2 shows the condition in which the film cartridge is loaded and photographing operation is conducted, with the film 27 being thrust or let out (e.g., a leader portion 27a is thrust out from a wound portion of film 27b). A characteristic point to be noted here is that the eject portion 48a of the eject member 48 is retracted downwards to a position where it is out of contact with the film cartridge. In the condition of FIG. 1, the eject portion 48 is at the upper position, where it pushes out the film cartridge.

In the following, the mechanism for driving the eject member 48 will be described with reference to FIGS. 3 through 8.

FIG. 3 is a diagram showing the basic construction of the mechanism. With reference to this drawing, the components which have not yet been described now will be described.

Numeral 49 indicates a toggle spring, which acts on a lock rotating member (pinion) 37, exerting a resilient biasing effect on the end portion in both the open and closed states to eliminate play and effect positioning. Numerals 50 and 51 indicate spring pegs, which are firmly attached to the transmission lever 46 and the transmission base plate 45, respectively, and resiliently biased to both the open and closed states by the action of a toggle spring 52. The eject member 48 is mounted to the transmission base plate 45 so as to be vertically slidable by guide members 53 and 54. Numeral 55 indicates an eject spring, which acts on a spring peg portion 53a of the guide member 53 and a spring peg portion 48b of the eject member 48, biasing the eject member 48 resiliently upwards. Numeral 56 indicates a holding lever, which is rotatably supported on the transmission base plate 45 by an axle 57. A holding protrusion 58 is firmly attached to the holding lever 56. Further, a guide groove 56a is provided, in which a guide protrusion 59 firmly attached to the transmission lever 46 is fitted so as to leave some play.

Figure 4:
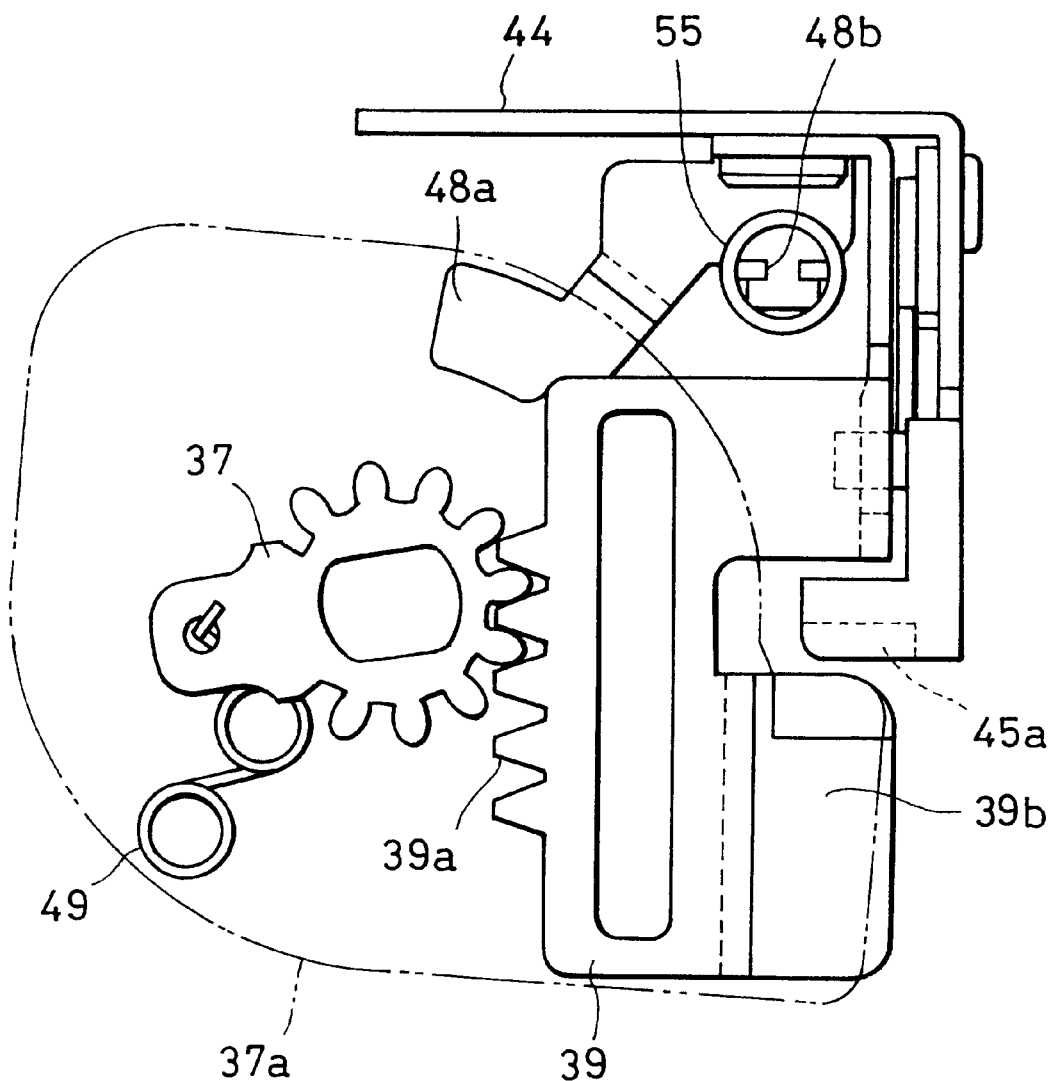
FIG. 4 is a top view of the mechanism shown in FIG. 3.
Figure 5:
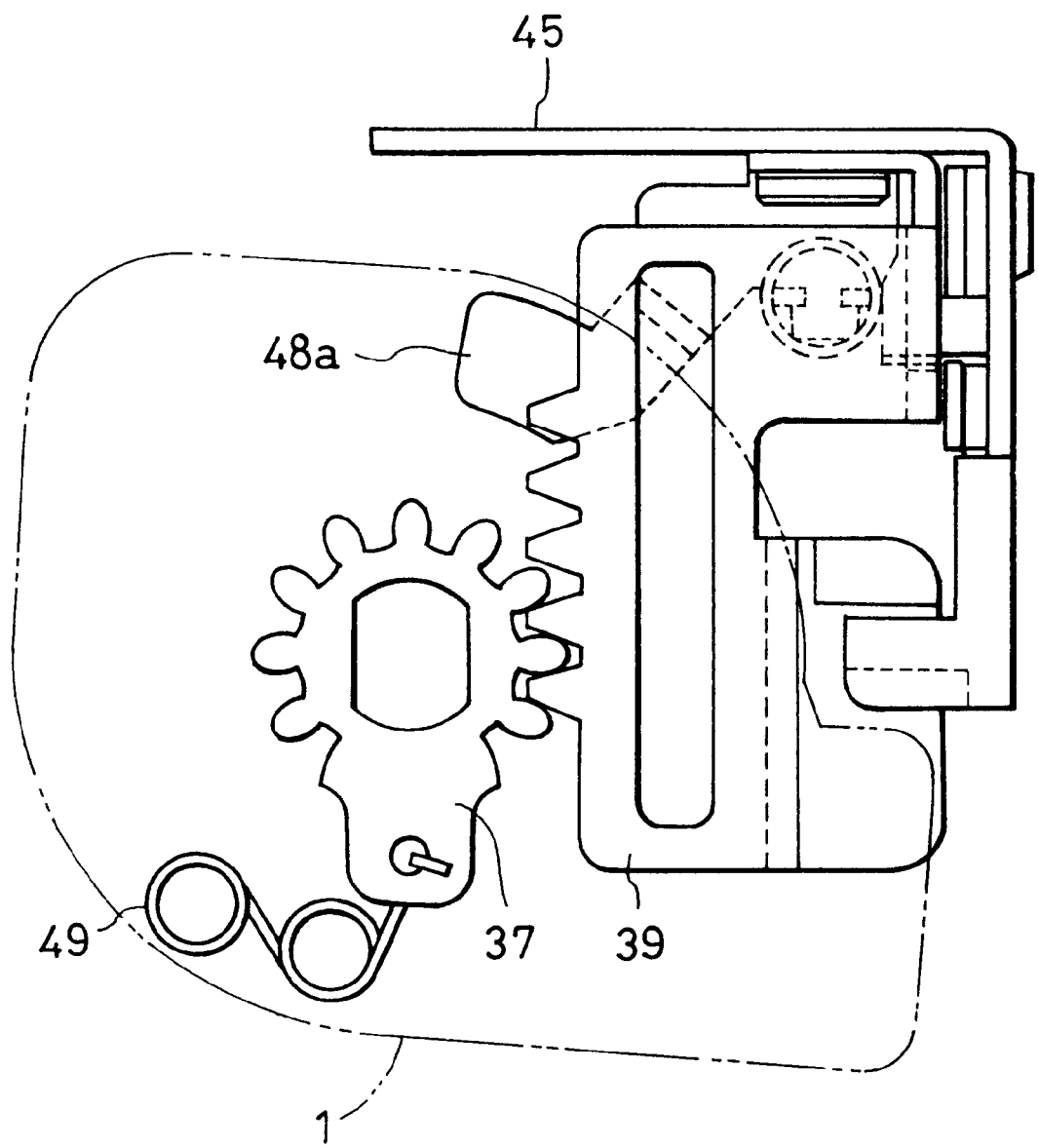
FIG. 5 is a diagram showing the mechanism of FIG. 4 in the locked state.

Next, the operation of the mechanism will be specifically described with reference to FIGS. 4 through 8. FIGS. 4 and 5 are diagrams showing the mechanism from the direction of the film cartridge inlet. FIG. 4 shows the condition in which the lock knob 34 is rotated clockwise to make it possible to open the cartridge chamber cover 31, and FIG. 5 shows the condition in which the lock knob 34 is rotated counterclockwise to complete the lock of the cartridge chamber cover 31.

Figure 6:
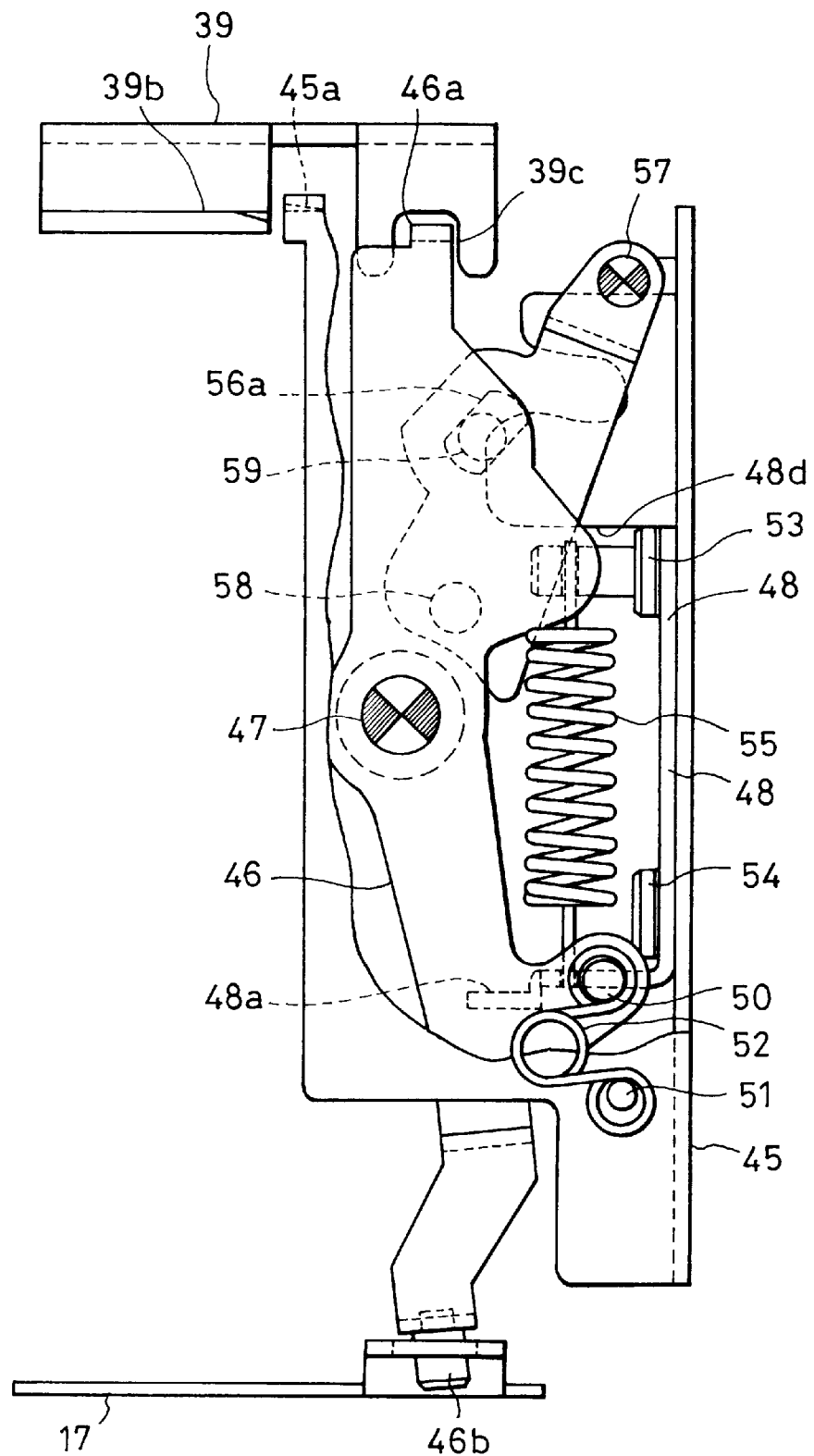
FIG. 6 is a side view showing the mechanical construction of an essential part of a camera according to an embodiment of the present invention in the state in which no film cartridge is loaded therein.
Figure 7:
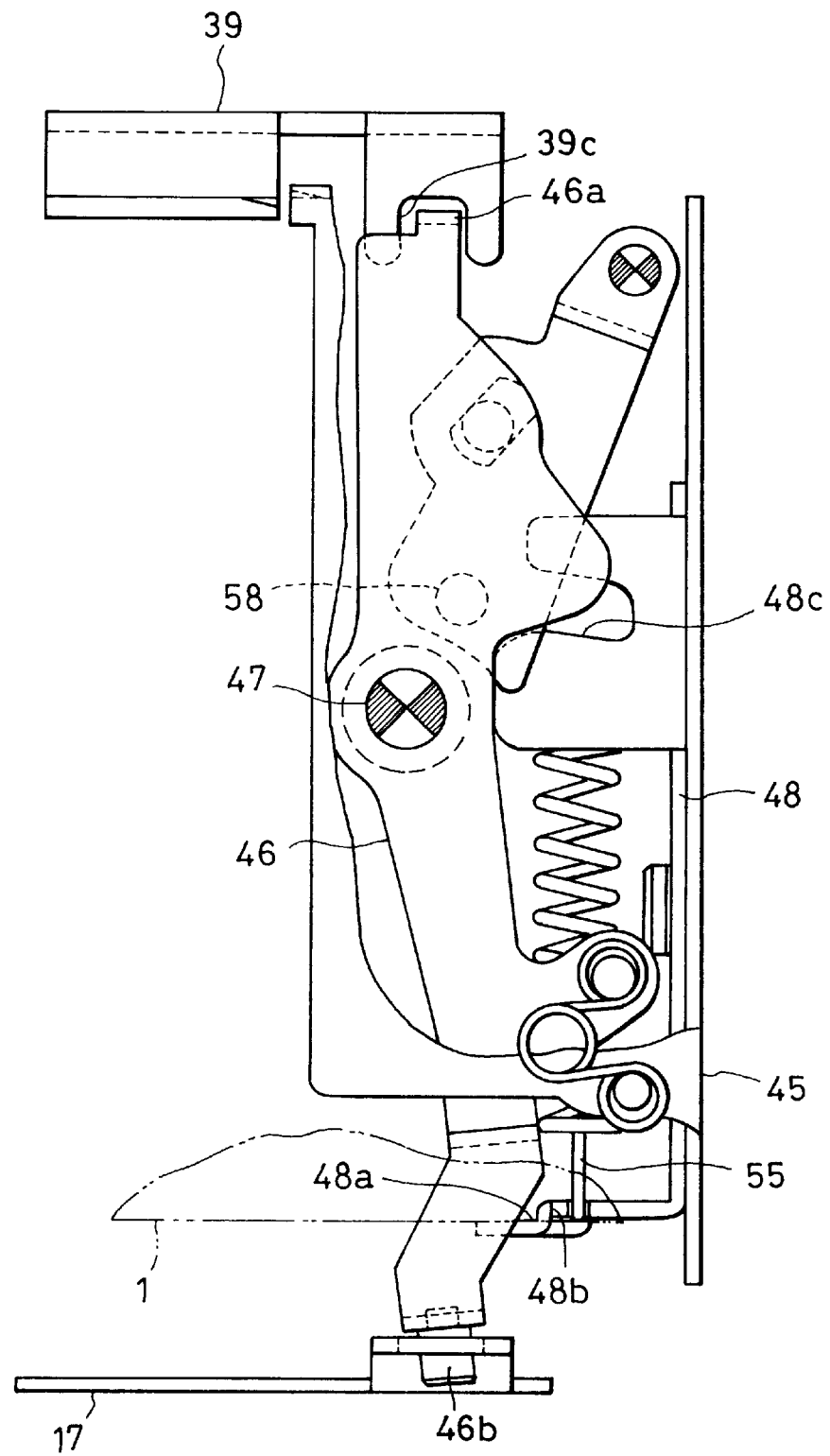
FIG. 7 is a side view showing the mechanical construction of an essential part, showing how the mechanism shown in FIG. 6 is loaded with a film cartridge.
Figure 8:
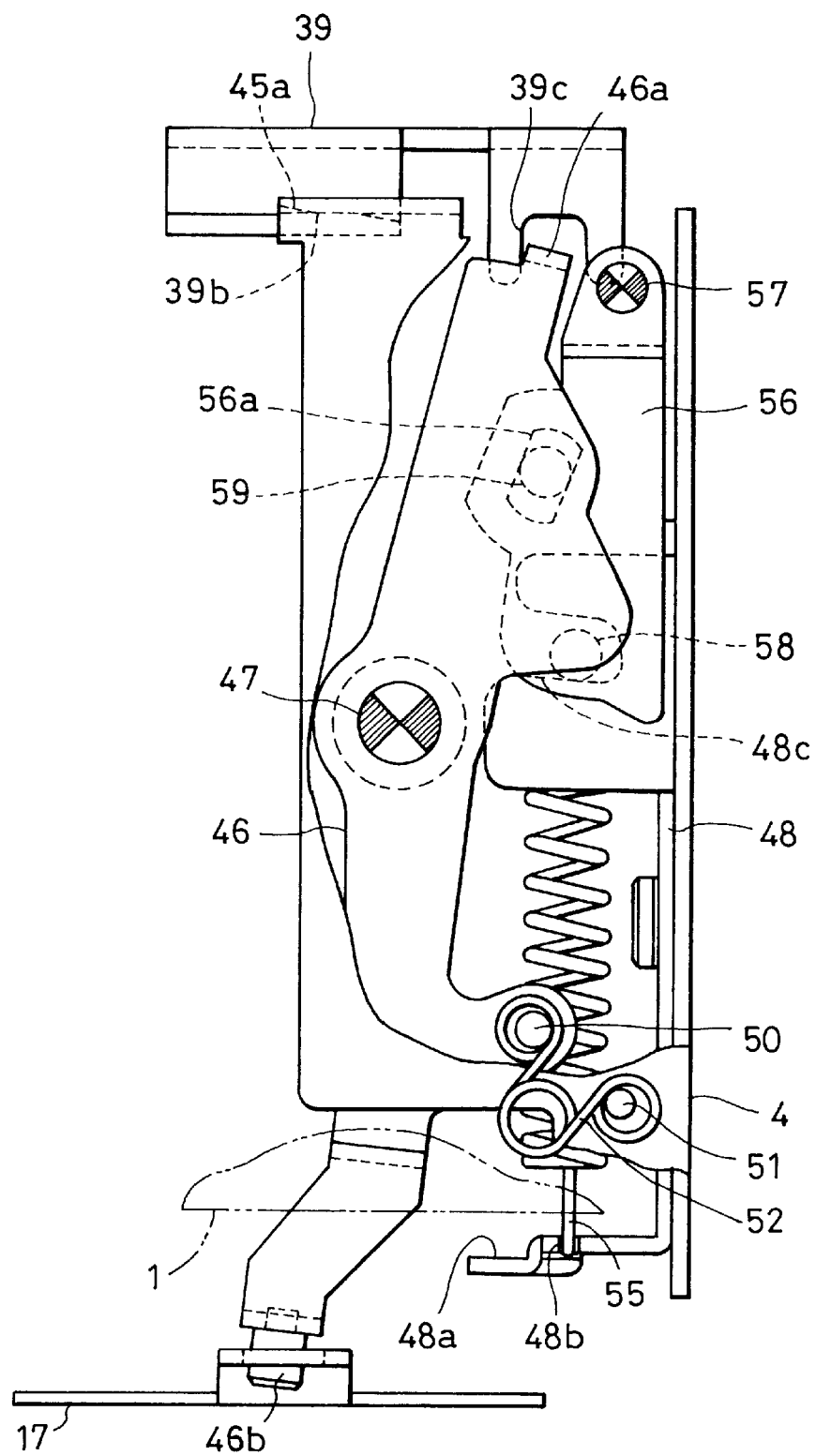
FIG. 8 is a side view showing the mechanical construction of an essential part, showing how the mechanism shown in FIG. 7 is loaded with a film cartridge and locked.

FIGS. 6 through 8 show the mechanism of FIGS. 1 through 3 as seen from the right side. FIG. 6 shows the condition in which the film cartridge chamber cover 31 is closed with no film cartridge being loaded and in which the lock operation by the lock knob 34 is not conducted; FIG. 7 shows the condition in which the cartridge chamber cover 31 is closed with the film cartridge being loaded and in which the locking operation by the lock knob 34 is not executed; and FIG. 8 shows the condition in which the lock knob 34 is turned counterclockwise to execute the locking operation.

In the condition of FIG. 6, the transmission portion 39c of the lock member 39 and the transmission portion 46a of the transmission lever 46 are just set at the engagement position, and no film cartridge is loaded, so that the eject member 48 is kept at the raised position, and the eject portion 48a remains in the condition shown in FIG. 1.

In the condition shown in FIG. 7, in contrast, the film cartridge is loaded, so that the eject portion 48a of the eject member 48 is directly pushed in a downward direction by the film cartridge against the biasing force of the eject spring 55. At this time, the cam portion 48c also moves downwards as shown in the drawing. When, in this condition, the lock knob 34 is turned counterclockwise, the mechanism is brought into the condition of FIG. 8 (of which a detailed description will be given below), and the eject portion 48a of the eject member 48 is brought into the condition shown in FIG. 8 and is out of contact with the film cartridge (See also FIG. 2).

In the following, the transition from the condition shown in FIG. 7 to the condition shown in FIG. 8 will be described.

When, in the condition shown in FIG. 7, the lock knob 34 is turned counterclockwise, the lock member 39 moves to the right as shown in FIG. 8, and the transmission lever 46 is rotated clockwise by the action of the transmission portions 39c and 46a. With this movement, the holding lever 56 rotates counterclockwise due to the action of the guide protrusion 59 firmly attached to the transmission lever 46 and the guide groove 56a of the holding lever 56. At this time, the eject member 48 is lowered to the position of FIG. 7 due to the abutment with the film cartridge, and the holding protrusion 58 firmly attached to the holding lever 56 acts on the cam portion 48c of the eject member 48 to further lower the eject member 48, causing the eject portion 48a to retract from the film cartridge 1.

In this condition, the spring biasing force of the eject spring 55 is received by the shaft 57 through the holding protrusion 58, so that no force is applied to the cartridge chamber cover 31. The cam portion 48c is shaped such that, in the initial process of abutment with the holding protrusion 58 as a result of the counterclockwise rotation of the holding lever 56, the eject member 48 is lowered, so that, in the final process, no clockwise torque for the holding lever 56 is generated.

When, in the condition shown in FIG. 6, the cartridge chamber cover 31 is opened, the lock member 39 also retracts with the cartridge chamber cover 31, and, when, in this condition, the transmission portion 46a of the transmission lever 46 is moved to the right, as seen in the drawing, on purpose or due to some trouble, the transmission lever 46 is rotated clockwise, whereby, as in the case described above, the transmission portion 46b acts on the transmission portion 17, and the opening/closing drive member 12 is brought from the condition of FIG. 9 in which the light lock door of the film cartridge is in the closed phase to the condition of FIG. 11 in which the light lock door is in the open phase. Thus, when, in this condition, the film cartridge is loaded, the phase of the engagement portion 3c of the light lock door 3 of the film cartridge, which is closed for lightproofness, will not agree with the phase of the key portion 12b of the opening/closing drive member 12. Thus, if, in this condition, the film cartridge is forced into the cartridge chamber 30, the engagement portion 3c of the light lock door 3 and the key portion 12b of the opening/closing drive member 12 will be damaged.

In view of this, in this embodiment, an arrangement is adopted in which, in such a condition, the film cartridge cannot enter the film cartridge chamber 30 over a predetermined distance, whereby the engagement portion 3c of the light lock door 3 of the film cartridge does not engage with the key portion 12b of the opening/closing drive member 12, thereby preventing the engagement portion 3c of the light lock door 3 and the key portion 12b of the opening/closing drive member 12 from being damaged.

That is, when the transmission lever 46 is rotated clockwise with the film cartridge chamber being loaded with no film cartridge, the transmission lever 46 will rotate clockwise with the eject portion 48 being at the raised position as shown in FIG. 6, and the holding protrusion 58 will not act on the cam portion 48c, as in the above-described normal state, in which the film cartridge is loaded, but, instead, will move further under the restricting portion 48d below the cam portion 48c.

When, in this condition, the film cartridge chamber 30 is loaded with a film cartridge, the film cartridge will, first, abut the eject portion 48a of the eject member 48, and, when the film cartridge is further pushed in against the spring biasing force of the eject spring 55, the eject member 48 will start to be lowered. However, the restricting portion 48d of the eject member 48 will soon abut the holding protrusion 58, making further lowering impossible.

Due to this arrangement, the engagement portion 3c of the film cartridge is prevented from being engaged with the key portion 12b of the opening/closing drive member 12, thereby reliably preventing them from being damaged.

As described above, in accordance with this embodiment, the resilient force of the cartridge discharge device for biasing the film cartridge, with which the cartridge chamber is loaded, in the discharge direction, does not act on the cover of the cartridge chamber, so that it is possible to prevent a lift or play of the cover of the cartridge chamber.

Further, in accordance with the above-described embodiment, the cartridge discharge device for moving the cartridge in the discharge direction from the cartridge chamber is interlocked with the movement of the holding device for keeping the cover of the cartridge chamber in the closed state so as to be moved to a position where it is out of contact with the cartridge with which the cartridge chamber is loaded, whereby it is possible to move the cartridge discharge device with good operability to a position where it is out of contact with the cartridge with which the cartridge chamber is loaded and, at the same time, the construction can be made small and safe and can eliminate the need to provide a protrusion in the exterior of the cartridge chamber.

Further, in accordance with the above-described embodiment, in the condition in which the cartridge discharge device for moving the cartridge in the discharge direction from the cartridge chamber has moved to the cartridge loading position, the cartridge discharge device is acted upon so as to be moved to a position where it is out of contact with the cartridge, so that no long movement stroke is needed in the structure for moving the cartridge discharge device to a position where it is out of contact with the cartridge, whereby the structure for moving the cartridge discharge device to a position where it is out of contact with the cartridge can be reduced in size.

Further, in accordance with the above-described embodiment, when the engagement portion to be engaged with the cartridge with which the cartridge chamber is loaded does not engage with the cartridge in a predetermined engagement phase, the engagement of the cartridge and the engagement portion is restricted, whereby it is possible to prevent the cartridge and the engagement portion to be engaged therewith from being damaged.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the measure to be taken in the present invention when there is a deviation in phase between the key groove portion of the light lock door of the film cartridge and the key portion of the opening/closing drive member thereof, is not restricted to that of the above-described embodiment. It is also possible to prohibit the loading of the cartridge chamber with the cartridge by some other method. Further, it is possible to adopt an arrangement in which, although loading of the cartridge chamber with a cartridge is permitted, their engagement is prohibited until the phase of the key groove portion of the light lock door of the film cartridge agrees with the phase of the key portion of the opening/closing drive member thereof.

Further, while the above embodiments have been described with respect to the case in which the film using condition of the camera can be set to any of the four conditions: "all frames unused", "part of the frames used, "all frames used" and "development completed", the present invention is also applicable to a camera which cannot be set to all of these four conditions but which can be set, for example, only to "part of the frames used", or only to "part of the frames used" and "all frames used".

Further, the present invention is also applicable to an image recording medium other than film.

The present invention is applicable to a film cartridge of a form other than the film cartridge described in the above embodiment, a cartridge having an image recording medium other than film, and further, a cartridge of some other type or a loading member other than a cartridge.

The present invention is not restricted to the type of camera in which the film cartridge is loaded from above (It may also be loaded from below or sidewise).

The present invention is not restricted to the type of camera in which the film cartridge is loaded in the axial direction.

Further, in the present invention, a device may be formed in accordance with all or part of the claims or the embodiments, or such a device may be combined with another device or constitute a component of a device.

Still further, the present invention is applicable to cameras of various types, such as a single-lens reflex camera, a lens shutter camera or a video camera, and further, optical apparatuses other than cameras and other apparatuses, or to a device that is applicable to such cameras, optical apparatuses and other apparatuses, or to a component constituting such a device.

What is claimed is:

1. An apparatus for use with a cartridge, comprising:

an engagement portion settable in either a first state or a second state and engageable with a cartridge loaded in a cartridge chamber;

a cartridge discharge portion, movable within the cartridge chamber, for moving a cartridge loaded in the cartridge chamber to discharge the cartridge from the cartridge chamber; and a device mechanically interlocked with said engagement portion that prevents movement of said cartridge discharge portion in the cartridge chamber when said engagement portion is in the second state, thereby preventing a loading operation of a cartridge into the cartridge chamber when said engagement portion is in the second state.

2. An apparatus according to claim 1, wherein said engagement portion includes a driving portion for opening and closing a cover of a cartridge loaded in the cartridge chamber.

3. An apparatus according to claim 2, wherein said driving portion closes the cover of a cartridge loaded in the cartridge chamber when the engagement portion is in the first state.

4. An apparatus according to claim 1, wherein said device interlocked with the engaging portion includes a cartridge discharge device for discharging a cartridge from the cartridge chamber.

5. An apparatus according to claim 1, wherein the cartridge includes an image recording medium.

6. An apparatus according to claim 1, wherein the cartridge includes a film.

7. An apparatus according to claim 1, wherein said apparatus includes a camera.

8. An apparatus according to claim 1, wherein said device interlocked with the engaging portion does not restrict a loading operation of a cartridge into the cartridge chamber when said engagement portion is in the first state.

9. An apparatus adapted for use with a cartridge, comprising:

an engagement portion settable in either a first state or a second state and engageable with a cartridge loaded in a cartridge chamber;

a cartridge discharge portion, movable within the cartridge chamber, for moving a cartridge loaded in the cartridge chamber to discharge the cartridge from the cartridge chamber; and a device mechanically interlocked with the engaging portion that prevents engagement of said engagement portion with a cartridge during a cartridge loading operation when said engagement portion is in the second state.

10. An apparatus according to claim 9, wherein said engagement portion includes a driving portion for opening and closing a cover of a cartridge loaded in the cartridge chamber.

11. An apparatus according to claim 10, wherein said driving portion closes the cover of a cartridge loaded in the cartridge chamber when the engagement portion is in the first state.

12. An apparatus according to claim 10, wherein said device interlocked with the engaging portion includes a cartridge discharge device for discharging a cartridge from the cartridge chamber.

13. An apparatus according to claim 10, wherein the cartridge includes an image recording medium.

14. An apparatus according to claim 10, wherein the cartridge includes a film.

15. An apparatus according to claim 10, wherein said apparatus includes a camera.

16. An apparatus according to claim 9, wherein said device interlocked with the engaging portion does not restrict engagement of the cartridge by said engagement portion when said engagement portion is in the first state.

17. A camera for use with a film cartridge, comprising:

an engagement portion settable in either a first state or a second state and engageable with a film cartridge loaded in a cartridge chamber, a cartridge discharge portion, movable within the cartridge chamber, for moving a film cartridge loaded in the cartridge chamber to discharge the film cartridge from the cartridge chamber; and a prohibiting member for prohibiting engagement of said engagement portion with the film cartridge when said engagement portion is set in the second state, said prohibiting member prohibiting a charging operation of said cartridge discharge portion effected by a loading operation of the film cartridge when said engagement portion is in the second state.

* * * * *

UNITED STATES PATENT AND TRADEMARK OFFICE
CERTIFICATE OF CORRECTION

PATENT NO. : 6,160,966  
DATED : December 12, 2000  
INVENTOR(S) : Shosuke Haraguchi Page 1 of 1

It is certified that error appears in the above-identified patent and that said Letters Patent is hereby corrected as shown below:

Column 5,
Line 33, "33c" should read -- 33 --.

Column 7,
Line 6, "member," should read -- member --.

Signed and Sealed this

Twenty-eighth Day of August, 2001

Attest:

*Nicholas P. Godici*

NICHOLAS P. GODICI
*Attesting Officer*        *Acting Director of the United States Patent and Trademark Office*